(12) United States Patent
Komatsu et al.

(10) Patent No.: US 6,730,400 B1
(45) Date of Patent: May 4, 2004

(54) ULTRAFINE COMPOSITE METAL PARTICLES AND METHOD FOR MANUFACTURING SAME

(75) Inventors: Teruo Komatsu, 1-24, Karita 2-chome, Sumiyoshi-ku, Osaka-shi, Osaka 558-0011 (JP); Hiroshi Nagasawa, 80-10, Minaminakaburi 2-chome, Hirakata-shi, Osaka 573-0094 (JP)

(73) Assignees: Teruo Komatsu, Osaka (JP); Hiroshi Nagasawa, Osaka (JP); Masaaki Kimoto, Nara (JP); Susumu Kitabayashi, Nara (JP)

( * ) Notice: Subject to any disclaimer, the term of this patent is extended or adjusted under 35 U.S.C. 154(b) by 151 days.

(21) Appl. No.: 10/018,141

(22) PCT Filed: Jun. 14, 2000

(86) PCT No.: PCT/JP00/03918

§ 371 (c)(1),
(2), (4) Date: Dec. 14, 2001

(87) PCT Pub. No.: WO00/76699

PCT Pub. Date: Dec. 21, 2000

(30) Foreign Application Priority Data

Jun. 15, 1999 (JP) .......................................... 11/206623

(51) Int. Cl.[7] .............................. B32B 5/16; B05D 5/00
(52) U.S. Cl. ........................ 428/403; 75/371; 75/373; 75/374; 75/770; 427/220
(58) Field of Search ............................ 428/403; 75/770, 75/370, 371, 373, 374; 427/220

(56) References Cited

U.S. PATENT DOCUMENTS 3,965,046 A * 6/1976 Deffeyes ..................... 502/337
5,250,101 A * 10/1993 Hidaka et al. ................ 75/362
5,698,483 A * 12/1997 Ong et al. ..................... 501/12
6,358,611 B1 * 3/2002 Nagasawa et al. ........... 428/403
6,436,167 B1 * 8/2002 Chow et al. .................. 75/371

FOREIGN PATENT DOCUMENTS

| JP | H3-104806 | 5/1991 |
|---|---|---|
| JP | H5-225823 | 9/1993 |
| JP | H8-85807 | 4/1996 |
| JP | H8-143916 | 6/1996 |
| JP | H10-183207 | 7/1998 |

* cited by examiner

Primary Examiner—H. Thi Le
(74) Attorney, Agent, or Firm—Koda & Androlia

(57) ABSTRACT

Ultrafine composite metal particles comprising a surfactant sheath and an organic compound sheath that surround a metal core in which metal atoms obtained by reduction precipitation from an organic metal compound have agglomerated, the particle diameter being 1 to 100 nm. The ultrafine composite metal particle may comprise a surfactant sheath that surrounds a metal core in which metal atoms obtained by reduction precipitation from an inorganic metal compound have agglomerated. The ultrafine composite metal particles are obtained by forming an ultrafine particle precursor by producing a colloidal solution of an organic metal compound or an inorganic metal compound in a nonaqueous solvent using a surfactant, and by reducing the ultrafine particle precursor by adding a reducing agent to this colloidal solution, thus forming ultrafine composite metal particles with a diameter of 1 to 100 nm and having at least a surfactant sheath around a metal cored.

10 Claims, No Drawings

ULTRAFINE COMPOSITE METAL PARTICLES AND METHOD FOR MANUFACTURING SAME

TECHNICAL FIELD

The present invention relates to a method for manufacturing ultrafine composite metal particles and more particularly to a method for manufacturing ultrafine composite metal particles that inexpensively mass-produces ultrafine composite metal particles that can be dispersed extremely well in an organic solvent and whose diameter can be controlled.

BACKGROUND ART

Ultrafine metal particles with a diameter under 100 nm have characteristics that are quite different from those of ordinary particles. In the case of gold (Au), for instance, one of the characteristics we see is a pronounced drop in the melting point when the particle diameter is 10 nm or less. These ultrafine metal particles also have high catalytic activity, among other features; and thus they are materials having much potential in various fields in the future.

In particular, these ultrafine metal particles have potential application to low-temperature sintering pastes and the like, used as wire forming materials in electronic devices and so forth by dry plating, which has virtually no adverse impact on the environment. Also, if the particle size is uniform, there is a possibility of two-dimensional orientation, allowing nano-structures to be formed, which holds promise for nonlinear optical effects, nano-electronic circuits, and so on.

However, problems were encountered with the methods typically employed to manufacture ultrafine metal particles. For instance, there is a known method for obtaining ultrafine metal particles in the vapor phase by evaporating the raw material metal in a vacuum or in the presence of a small amount of gas.

With this method, however, the amount of ultrafine metal particles that can be produced at one time is generally small because they are produced in a vacuum apparatus. Also, equipment is required for an electron beam, plasma, laser, inductive heating, or the like in order to evaporate the metal. This means that production costs are higher. Thus this method cannot truly be considered suitable for mass production. Furthermore, ultrafine metal particles obtained by one of these vapor phase methods tend to be in the form of clumps because they have no particle size uniformity and are relatively susceptible to agglomeration.

Methods in which ultrafine metal particles are prepared from the liquid phase have been proposed in an effort to make mass production feasible. For example, in a known method, ultrafine silver particles are manufactured by reducing an anmmoniac silver nitrate complex solution in a hydrophobic reaction tank. Unfortunately, ultrafine metal particles obtained by a liquid phase process also have no size uniformity and are relatively prone to agglomeration. In view of this, it has been proposed that a surfactant be subsequently added to this ultrafine metal particle solution to form a protective colloid in order to impart dispersion stability. Still, there are few applications for a protective colloid of ultrafine particles in a clumped state with poor dispersibility. Furthermore, almost nothing has been done about achieving uniform particle size.

In view of this, in Japanese Patent Application Laid-Open (Kokai) No. H10-183207, the inventors proposed ultrafine composite metal particles in which a sheath of an organic metal compound was formed around a metal core. A specific method for manufacturing these particles was also proposed therein. More specifically, when an organic metal compound is pyrolyzed at a temperature below its complete decomposition temperature in an inert gas atmosphere shut off from air, the organic component escapes as the compound decomposes, and the reduced metal agglomerates, forming a metal core at the center. This metal core is covered all around with a sheath of undecomposed organic metal compound, forming ultrafine composite metal particles in which the organic compound is situated as the outermost layer.

The property of these ultrafine composite metal particles is that their particle diameter is extremely uniform. Also, because the organic compound is situated as the outermost layer and organic groups protrude radially, even if numerous ultrafine composite metal particles agglomerate, they agglomerate with the organic groups facing each other. Therefore, even in a solid state, the powder form is maintained to a high degree and the particles tend not to clump. Also, if this powder is put in an organic solvent, the organic groups dissolve in the organic solvent, and as a result the ultrafine composite metal particles readily disperse individually in organic solvents.

Thus, the ultrafine composite metal particles proposed by the inventors have uniform size and good dispersibility. However, a drawback is that they are unsatisfactory in terms of being suited to mass production, their cost, and the ability to vary the particle size. In other words, since the above manufacturing method requires that an organic metal compound be pyrolyzed in an inert gas atmosphere shut off from air, the air inside of a sealed vessel must be replaced with the inert gas. Furthermore a sealed apparatus is needed in order to exhaust the pyrolyzed organic gas. Consequently, this method does not suit itself to mass production, and as a result the cost of the ultrafine composite metal particles is higher.

Also, this manufacturing method does not permit the size of the ultrafine composite metal particles to be varied. The individual ultrafine composite metal particles are substantially the same size, but it is very difficult to make the particles larger or smaller. This weak point limits their applications. A novel method for manufacturing ultrafine composite metal particles needs to be developed in order to solve these problems.

Furthermore, if the particle size is made variable, some technique needs to be developed for further enhancing dispersibility in order to ensure the stability of the ultrafine particles.

The present invention provides ultrafine composite metal particles characterized in that an organic compound sheath that originates from an organic metal compound and a surfactant sheath surround a metal core in which metal atoms obtained by reduction precipitation from an organic metal compound have agglomerated, and the particle diameter is 1 to 100 nm.

The present invention provides ultrafine composite metal particles characterized in that a surfactant sheath surrounds a metal core in which metal atoms obtained by reduction precipitation from an inorganic metal compound have agglomerated, and the particle diameter is 1 to 100 nm.

In the above ultrafine composite metal particles of the present invention, the metal core is made up of an alloy of a plurality of different metals.

In the above ultrafine composite metal particles of the present invention, the metal component is at least one type selected from among Cu, Ag, Au, Zn, Cd, Ga, In, Si, Ge, Sn, Pd, Fe, Co, Ni, Ru, Rh, Pd, Os, Ir, Pt, V, Cr, Mn, Y, Zr, Nb, Mo, Ca, Sr, Ba, Sb, and Bi.

The present invention provides a method for manufacturing ultrafine composite metal particles, and the invention is characterized in that the method comprises a first step of forming an ultrafine particle precursor by producing a colloidal solution of an organic metal compound in a mixed solvent of a hydrophobic nonaqueous solvent and a hydrophilic nonaqueous solvent, and a second step of reducing the ultrafine particle precursor by adding a reducing agent to this colloidal solution, thereby forming ultrafine composite metal particles with a diameter of 1 to 100 nm and having an organic compound sheath around a metal core.

The present invention provides a method for manufacturing ultrafine composite metal particles, and the invention is characterized in that the method comprises a first step of forming an ultrafine particle precursor by producing a colloidal solution of an organic metal compound or an inorganic metal compound in a mixed solvent of a hydrophobic nonaqueous solvent and a hydrophilic nonaqueous solvent using a surfactant, and a second step of reducing the ultrafine particle precursor by adding a reducing agent to this colloidal solution, thereby forming ultrafine composite metal particles with a diameter of 1 to 100 nm and having at least a surfactant sheath around a metal core.

The present invention provides a method for manufacturing ultrafine composite metal particles, and the invention is characterized in that the method comprises a first step of forming an ultrafine particle precursor by producing a colloidal solution of an organic metal compound or an inorganic metal compound in a nonaqueous solvent using a surfactant, and a second step of reducing the ultrafine particle precursor by adding a reducing agent to this colloidal solution, thereby forming ultrafine composite metal particles with a diameter of 1 to 100 nm and having at least a surfactant sheath around a metal core.

In the above method for manufacturing ultrafine composite metal particles of the present invention, the organic metal compound is composed of a plurality of organic metal compounds of different types of metal, and the produced metal core is made up of an alloy of a plurality of different metals.

In the above method for manufacturing ultrafine composite metal particles of the present invention, the inorganic metal compound is composed of a plurality of inorganic metal compounds of different types of metal, and the produced metal core is made up of an alloy of a plurality of different metals.

Best Mode for Carrying Out the Invention

The ultrafine composite metal particles pertaining to the present invention and the manufacturing method thereof will now be described in detail along with embodiments thereof.

The present invention proposes novel ultrafine composite metal particles, and the goal of which is increasing the dispersion stability of ultrafine composite metal particles. These ultrafine composite metal particles have a surfactant sheath around the outside of a metal core, and the ultrafine metal particles can be individually and powerfully dispersed in a nonaqueous solvent such as an organic solvent because of the surfactant sheath. The dispersion stability here is better than that obtained with an organic compound sheath composed of a conventional organic metal compound.

The metal core at the center of the ultrafine composite metal particles is made up of a metal component that is obtained by reduction precipitation from an organic metal compound or an inorganic metal compound. If the source of the metal core is an organic metal compound, a metal core composed of the metal component is situated in the interior surrounded by a surfactant sheath and an organic compound sheath. If the source of the metal core is an inorganic metal compound, the metal core is situated in the interior surrounded by just a surfactant sheath. The organic compound, surfactant, and metal component here are integrated together, with all or part thereof bound, as in a micelle structure, for example.

The metal core composed substantially of the metal component may in some cases also include an organic metal compound or an organic component originating therein, an inorganic metal compound or inorganic component, etc., and these cases are also encompassed by the present invention. The surfactant sheath surrounding the metal core is substantially made up of a surfactant but may also include a metal component, organic component, inorganic component, etc. Likewise, the organic compound sheath is substantially made up of an organic compound, but may also include a surfactant component.

The dispersion stability of the ultrafine composite metal particles pertaining to the present invention is mainly attributable to the surfactant sheath. It is therefore preferable for the surfactant sheath to be situated on the most outside of the ultrafine composite metal particles. The ultrafine composite metal particles can have any of the following structures: a structure composed of a metal core and a surfactant sheath, a structure composed of a metal core, an organic metal compound layer, and a surfactant sheath, and a structure composed of a metal core, an organic metal compound layer an organic compound sheath, and a surfactant sheath. The sheath may also consist of a mixture of an organic compound and a surfactant, that is, it may be a single sheath in which the organic compound sheath and the surfactant sheath are combined. In any case, the ultrafine composite metal particles of the present invention are characterized in that their outermost part is surrounded with a surfactant sheath.

Although the dispersion stability of the ultrafine composite metal particles pertaining to the present invention is attributable to the surfactant sheath, even better dispersion stability will be obtained if the metal core is surrounded by both an organic compound sheath and a surfactant sheath. Therefore, when the ultrafine composite metal particles are made from an organic metal compound, a joint dispersion effect is obtained from the surfactant sheath and the organic compound sheath. When the ultrafine composite metal particles are made from an inorganic metal compound, the dispersion effect comes from the surfactant sheath. Either way, the powerful dispersive force of the surfactant sheath ensures the dispersion stability of the ultrafine composite metal particles of the present invention.

The next characteristic of the present invention is that a colloidal solution reduction method is employed to produce the above-mentioned ultrafine composite metal particles. The biggest problems with a conventional method in which an organic metal compound is heated and reduced in a sealed apparatus were that it was difficult to control the particle size and the method was not suited to mass production. The present invention employs a colloidal solution reduction method as the means for solving both of these problems at a stroke.

More specifically, the manufacturing method of the present invention is characterized in that colloid particles of agglomerated organic metal compound or inorganic metal compound are formed, and these colloid particles serve as an ultrafine particle precursor. If the size of these colloid particles is controlled, then the size of the ultrafine composite metal particles produced by reduction can be varied. Since the colloid is formed in a solution, the solution may be open to the atmosphere. Therefore, the procedure is simple and lends itself well to mass production, affording inexpensive ultrafine particles.

There are three methods for making a colloid from a metal compound in the present invention. The first method involves combining an organic metal compound with a hydrophobic nonaqueous solvent and a hydrophilic nonaqueous solvent. To make a colloid from an organic metal compound or an inorganic metal compound, there is a second method in which a hydrophobic nonaqueous solvent and a hydrophilic nonaqueous solvent are combined, and a surfactant is added to this. There is a third method for making a colloid from an organic metal compound or an inorganic metal compound, in which a surfactant is combined with a nonaqueous solvent.

The particle size of the colloid can be controlled by adjusting the concentration of the organic metal compound or inorganic metal compound, or by adjusting the amounts and ratio in which the hydrophobic solvent and hydrophilic solvent are added, or by adjusting the amount in which the surfactant is added, or by adjusting the metal reduction conditions. The particle diameter of the colloid will increase if the concentration of organic metal compound or inorganic metal compound is raised or if the amount of added surfactant is decreased. The particle size of the colloid will decrease if the above is reversed.

If the colloid has a large particle diameter, there will be more molecules of organic metal compound or inorganic metal compound contained in a single colloid. Therefore, the metal content will be high if the particle size of the colloid is large, so the metal core will have a large diameter, but a metal core with a small diameter can be formed if the particle diameter of the colloid is small. Even at a given colloid diameter, the metal core diameter can sometimes vary depending on the condensation density. Thus, the control of the diameter of ultrafine metal particles can be achieved for the first time with the colloidal solution reduction method of the present invention.

The ultrafine composite metal particles manufactured with the present invention can be used in a variety of applications, such as forming ultra-thin metal film electrodes by sintering, or supporting ultrafine metal particles in an island pattern on a substrate. This sintering causes the surfactant sheath or organic compound sheath around the metal core to decompose and escape, so the metal core ends up remaining as ultrafine metal particles. The above-mentioned electrode films and so forth are formed from these ultrafine metal particles. Therefore, a technique that allows the particle diameter of a metal core to be controlled is extremely important. The present invention is the first time this need has been met.

With the first method of the present invention, there is a case in which an organic metal compound is dissolved and dispersed in a hydrophobic nonaqueous solvent, and a hydrophilic nonaqueous solvent is then added, and a case in which an organic metal compound is dissolved and dispersed in a hydrophilic nonaqueous solvent, and a hydrophobic nonaqueous solvent is then added. A colloid of the organic metal compound can be produced in either case. Since no surfactant is used, when this colloid is reduced it forms ultrafine composite metal particles in which a metal core is surrounded by an organic compound sheath. The inventors have succeeded for the first time in obtaining the ultrafine composite metal particles that used to be obtained by a vapor phrase reaction process by the colloidal solution reduction method of the present invention. What is different from a conventional approach is that the colloidal solution reduction method allows the particle size of the metal core to be controlled.

With the second method, not only is an organic metal compound or inorganic metal compound made into a colloid with a hydrophobic nonaqueous solvent and a hydrophilic nonaqueous solvent, but the colloid formation is also promoted by the addition of a surfactant, which also enhances the stability and dispersibility of the colloid particles. The organic metal compound or inorganic metal compound may be added ahead of either of the solvents. When an organic metal compound is used, reduction forms both an organic compound sheath and a surfactant sheath around the metal core. When an inorganic metal compound is used, reduction causes the inorganic component to be dissolved and dispersed in the solvent, so just a surfactant sheath is formed around the metal core. In both cases, the ultrafine composite metal particles are covered by a surfactant sheath, so dispersibility in a solvent is good.

With the third method, a surfactant is added to an organic metal compound or inorganic metal compound, and this product is dissolved and dispersed in a nonaqueous solvent to produce a colloid. Therefore, colloid formation is accomplished with just a surfactant. When an organic metal compound is used, reduction forms both an organic compound sheath and a surfactant sheath around the metal core. When an inorganic metal compound is used, reduction causes the inorganic component to be dissolved and dispersed in the solvent, so just a surfactant sheath is formed around the metal core. Because the resulting ultrafine composite metal particles are covered by a surfactant sheath, they are powerfully dispersed in a solvent.

As discussed above, the colloid particles produced by the first method do not contain a surfactant, but a surfactant surrounds the outermost part of the colloid particles produced by the second and third methods. When a reducing agent is added to these colloidal solutions, the metal component of the organic metal compound or inorganic metal compound is reduced and precipitated, forming a metal core at the center of the colloid. The amount of metal contained in the colloid particles determines the diameter of this metal core. The decomposed organic component not only dissolves and disperses in the solvent but also forms an organic compound sheath around the metal core. The decomposed inorganic component, on the other hand, dissolves or disperses completely in the solvent.

Any organic metal compound can be used in the present invention as long as it has organic groups, and no particular restrictions are imposed thereon. Examples include organic acid salts, and organic metal compounds of alcohols. More specific examples include naphthenates, octylates, stearates, benzoates, paratoluylates, n-decanoates, and other fatty acid salts, isopropoxide, ethoxide, and other metal alkoxides, and acetylacetone complex salts of the above-mentioned metals.

Especially, oleates, paratoluylates, stearates, n-decanoates, metal ethoxides, metal acetylacetonates, and so forth are particularly favorable. A straight chain fatty acid salt is particularly favorable as a fatty acid salt, and usually has about 1 to 30 carbons, and preferably 1 to 18. These organic metal compounds can be used singly or in combinations of two or more types. There are no particular restrictions on the metal of the organic metal compound, which can be suitably selected according to the intended application of the finished product and other such considerations.

Examples of the organic compounds obtained by the reduction of these organic metal compounds include formic acid, acetic acid, propionic acid, stearic acid, oleic acid, palmitic acid, lauric acid, myristic acid, decanoic acid, octanoic aci, valeric acid, and other fatty acids; and alcohols such as stearyl alcohol, oleyl alcohol, palmityl alcohol, lauryl alcohol, and myristyl alcohol. The organic compound sheath of the present invention is made up of the organic groups of these reduced organic compounds and organic metal compounds.

There are no particular restrictions on the inorganic metal compound in the present invention, and inorganic metal salts are an example. Specific examples include gold chloride, platinum chloride, rhodium chloride, ruthenium chloride, chloroaurates, chloroplatinates, silver nitrate, gold hydrogen nitrate, gold hydroxide, platinum hydroxide, rhodium hydroxide, ruthenium hydroxide, palladium hydroxide, hexaammine platinum, copper sulfate, nickel sulfate, platinum sulfate, and silver phosphate.

When the metal in these inorganic metal compounds is reduced by a reducing agent and precipitated into a metal core, the remaining inorganic component is dissolved and dispersed in a nonaqueous solvent, and therefore does not remain in the ultrafine composite metal particles. The structure is therefore one in which a surfactant sheath (serving as a dispersant) surrounds the metal core.

There are no particular restrictions on the metal component as long as it originates in the above-mentioned organic metal compound or inorganic metal compound, but it is preferable to use Cu, Ag, Au, Zn, Cd, Ga, In, Si, Ge, Sn, Pd, Fe, Co, Ni, Ru, Rh, Pd, Os, Ir, Pt, Au, V, Cr, Mn, Y, Zr, Nb, Mo, Ca, Sr, Ba, Sb, or Bi.

With the method of the present invention, it is also possible to prepare ultrafine composite metal particles comprising an alloy of these metals by using an organic metal compound or inorganic metal compound containing two or more types of metal. An alloy type of ultrafine composite metal particles can also be prepared by mixing two or more organic metal compounds or inorganic metal compound with different types of metal.

There are no particular restrictions on the form of the raw material organic metal compound, which may be a powder, a liquid, etc.

The proportion of the metal component in the ultrafine composite metal particles of the present invention can be suitably selected according to the intended application of the finished product and other such considerations, but about 50 to 90 wt % is usually good. When the particles are used for a metal coating, for example, the above amount is usually about 50 to 80 wt %, with 60 to 80 wt % being particularly favorable.

A surfactant is used to form the colloid with the present invention. This surfactant is sometimes also called a dispersant in this specification. This surfactant can be any of a variety of surfactants, such as a cationic surfactant, anionic surfactant, amphoteric surfactant, or nonionic surfactant, and the use of a nonionic surfactant is preferred. Any known surfactant can be used for this purpose. Examples include the following:

Alkylamine salts, quaternary ammonium salts, polyoxyethylene alkylamines, and so forth can be used as cationic surfactants.

Fatty acid salts, higher alcohol sulfuric ester salts, alkylbenzenesulfonates, and so forth can be used as anionic surfactants.

Alkyl betaines and so forth can be used as amphoteric surfactants.

Polyoxyethylene alkyl ethers, polyoxyethylene alkyl phenol ethers, sorbitan fatty acid esters, polyoxyethylene sorbitan fatty acid esters, fatty acid monoglycerides, and so forth can be used as nonionic surfactants.

In particular, examples of surfactants used by the inventors include TEXAPHOR 963 (made by San Nopco), which is a polycarboxylic acid amine salt, SORBON T80 (made by Toho Chemical Industry), which is a sorbitan carboxylate, RHEODOL SP010 (made by Kao), which is sorbitan carboxylate, and AMIET105 (made by Kao), which is a polyoxyethylenealkylamine, although other surfactants can also be used.

The hydrophobic nonaqueous solvent used in the present invention is an organic solvent such as a petroleum-based hydrocarbon such as toluene, xylene, kerosene, or cyclohexane, or a terpene such as turpentine oil or terpineol. The hydrophilic nonaqueous solvent can be an alcohol such as methanol or ethanol, a ketone such as acetone, and the like.

The nonaqueous solvent used in the present invention can be either a hydrophobic nonaqueous solvent or a hydrophilic nonaqueous solvent.

Water is excluded from the list of solvents that can be used in the present invention. There are indeed some organic metal compounds and inorganic metal compound that will dissolve in water. However, since water is partially ionized, it has the property of charging the colloid particles in an aqueous solution. If the colloid particles become charged, then there will be cases of electrical repulsion; but there will also be cases in which the particles clump together. It is, therefore, difficult to obtain uniform colloid particles of the desired size. Also, if water gets into the ultrafine composite metal particles that are the finished product, the metal component will be oxidized and modified into a metal oxide when it comes into contact with air. It is for these reasons that water is not included as a possible solvent with the present invention.

In the present invention, after the colloid particles have been formed, a reducing agent must be added to the colloidal solution to reduce and precipitate the metal from the organic metal compound or inorganic metal compound and form a metal core. There are no restrictions whatsoever on the reducing agent used for this purpose. Examples include aldehydes, sugars, formic acid, oxalic acid, hydrazine, aliphatic amines, and other such organic compounds, carbon monoxide, sulfur dioxide, sulfites, and other such lower oxides or salts of lower oxygen acids, and hydrides or hydrogen complexes of iodine, boron, aluminum, silicon, tin, and so on. Hydrazine, acetaldehyde, fatty acid tin salts, and the like can be used to particular advantage. Hydrogen can also be used as a reducing agent.

When the reduction is effected by a reducing agent, the reduction can be performed by adding the reducing agent directly to the solution or by adding a solution in which a reducing agent has already been dissolved in a solvent. When the reducing agent is added directly to the solution, there are no particular restrictions on the concentration of the reducing agent as long as it is still soluble in that solvent at room temperature. Again when the reducing agent is added as a solution, there are no particular restrictions as long as it is still soluble in that solvent at room temperature. In other words, the reducing agent should be dissolved in the solution.

There are no particular restrictions on the reduction temperature as long as it allows the reaction phase to be maintained in a solution state. In particular, when methanol, ethanol, or another alcohol, or glucose, ascorbic acid, or the like is used as the reducing agent, it is preferable for the temperature to be gradually raised to the temperature at which the reduction action appears.

The reduction time will vary with the type and concentration of the reducing agent but is not particularly restricted. The reduction time can be from 10 minutes to 20 hours, for example.

In the first method of the present invention, an organic compound sheath must be formed around the metal core because no surfactant sheath is formed. There are two ways that form this organic compound sheath. First, the reduction can be halted midway. leaving unreduced organic metal compound around the metal core, so that the organic groups thereof constitute the organic compound sheath. Second, the organic component resulting from the reduction of the organic metal compound bonds to the outer surface of the colloid particles without being released into the solvent, and this organic component then constitutes the organic compound sheath. To form the organic compound sheath in the first case, the reduction of the organic metal compound in the colloid particles must be halted midway, rather than being performed to completion, so that the reduction is only partial.

When the reduction is halted midway, the resulting structure comprises an organic metal compound layer surrounding a metal core. In particular, since the metal of the outermost organic metal compound faces inward, the organic groups protrude outward. These outwardly protruding organic groups become the organic compound sheath.

With the second method of the present invention, an organic compound sheath and a surfactant sheath are formed in the case of an organic metal compound, and only a surfactant sheath is formed in the case of an inorganic metal compound. Because at least the surfactant sheath is formed around the outside of the metal core, the organic compound sheath is not necessary, in which case the reduction should be performed completely. Naturally, the reduction must be halted midway if an organic compound sheath is to remain. For an inorganic metal compound, it is preferable to perform the reduction completely, thus releasing the inorganic component into the solvent, so that the metal core is surrounded directly by the surfactant sheath.

The third method of the present invention is the same as the above-described second method. In other words, an organic compound sheath and a surfactant sheath are formed in relation to an organic metal compound, and only a surfactant sheath is formed in relation to an inorganic metal compound. The rest of the situation is also the same as in the second method and will therefore not be repeatedly described here.

When a surfactant layer and an organic compound layer are both present, there may be separation between the layers; and there will also be cases in which the layers a become mixed at the same location, and the surfactant and organic groups protrude outward in a mixed state.

Ways of halting the reduction midway include limiting the amount of added reducing agent to a partial reduction amount, lowering the solution temperature, adding a reduction stopper, and separating the ultrafine composite metal particles from the solution at a stage of partial reduction. Any of these stopping methods may be employed, and lowering the temperature is especially favorable.

Benzoyl peroxide, sodium iodate, potassium permanganate, and various other oxidants can be used as the reduction stopper. Since the produced ultrafine particles will end up being oxidized if the stopper is added excessively, it is best to carefully add only the minimum required amount.

A suitable average diameter of the ultrafine composite metal particles is 1 to 100 nm in the present invention. The smaller is the average particle diameter, the more pronounced will be the ultrafine particle properties not found in bulk metals. Preferably, the average particle diameter is about 1 to 10 nm, although this will vary with the intended application of the finished product. For instance, if these ultrafine composite metal particles are to be used for coating the surface of a metal or metal oxide, the size is usually about 1 to 10 nm and preferably 1 to 5 nm.

In addition to these components, to the extent that the effect of the present invention is not compromised, it is also possible with the manufacturing method of the present invention to make the work easier by adding any of various known additives such as liquid paraffin, various petroleum-based high-boiling point solvents, and oils.

Upon completion of the reduction, concentration and refining are performed as needed. Any known refining method can be used, such as centrifuging, membrane refining, solvent extraction, and concentration drying.

The structure of the ultrafine composite metal particles produced by the present invention can be analyzed by surface plasmon absorption spectrography, electron microscopy, atomic force microscopy, X-ray diffraction, elemental analysis, thermal analysis, and other such methods. It was proven from these results that there is a metal core and a surrounding surfactant sheath. While it is difficult to distinguish the surfactant sheath from the organic compound sheath by electron microscopy or atomic force microscopy, it was proven by elemental analysis that both sheathes are present.

EXAMPLES

The characteristic features of the present invention will now be further clarified by giving examples.

Example 1

Production of Copper Oleate Colloid by First Method

Ultrafine composite metal particles were prepared by using copper oleate as the organic metal compound. First, copper oleate was prepared according to a known method. Commercially available sodium oleate was dissolved in pure water by heating to 60° C. Separately, an equivalent amount of copper nitrate was dissolved in pure water and then added to the previously prepared sodium oleate aqueous solution. The precipitated oily copper oleate was separated with a separating funnel.

50 g of the copper oleate thus obtained was weighed out and put into a 1000 ml round-bottom flask, and 100 g of toluene was added as a hydrophobic nonaqueous solvent. 50 g of acetone was then added as a hydrophilic nonaqueous solvent, and the system was stirred with an ultrasonic emulsifier to prepare a colloidal solution. To this was added 50 ml of a methanol solution of sodium borohydride with a concentration of $1.0 \times 10^{-2}$ M as a reducing agent, and the system was heated to 50° C. to promote reduction. As a result, the colloidal solution gradually turned brown. Ten minutes later 200 ml of methanol was added as a precipitation solvent, and the system was cooled to halt the reduction reaction, which yielded precipitate.

This modified powder was observed under a transmission electron microscope, which revealed it to be composed of ultrafine particles with a diameter of approximately 10 nm and to have an extremely high uniformity of particle size. A core of metallic copper was confirmed by powder X-ray diffraction.

When this ultrafine particle powder was dispersed in toluene and benzene, no precipitation was noted in either case, with the system in a transparent solubilized state. It was surmised from this that lipophilic groups were present around the outermost part of the ultrafine particles, and it was confirmed from an atomic force micrograph (AFM) of these ultrafine particles that an organic compound sheath was present around a metal core.

A glass substrate was coated with this ultrafine composite metal (copper) particle powder and heated to approximately 250° C. in a nitrogen atmosphere, whereupon the organic component decomposed and escaped, forming a copper coating film on the glass substrate. It was therefore proven that these ultrafine composite metal particles composed of a copper core and copper oleate had high dispersibility and furthermore formed a metal film extremely well.

Example 2

Production of Silver Abietate Colloid by First Method

Ultrafine composite metal particles were prepared by using silver abietate as the organic metal compound. First, silver abietate was prepared according to a known method. Sodium abietate was dissolved in pure water by heating to 60° C. Separately, an equivalent amount of silver nitrate was dissolved in pure water and then added to the previously prepared sodium abietate aqueous solution. The precipitated silver abietate was filtered off with a suction filter, after which it was dried with a dryer.

50 g of this silver abietate was dissolved in 300 ml of turpentine oil in a glass beaker. 50 ml of methyl alcohol was then added to prepare a colloidal solution. To this was added a methyl alcohol solution of hydrazine with a concentration of $1.0 \times 10^{-2}$ M, whereupon the solution took on coloration. Ten minutes later 200 ml of methanol was added as a precipitation solvent, and the system was cooled to halt the reduction reaction, which yielded precipitate.

This precipitate was observed under a transmission electron microscope, which revealed it to be ultrafine composite metal particles with a diameter of 3 nm.

Example 3

Production of Silver Acetate Colloid by Second Method

Silver acetate was dissolved in methanol (a hydrophilic nonaqueous solvent) to create a silver acetate solution with a concentration of 0.1 M (mol/l). To 5 ml of this solution was added 40 ml of toluene (a hydrophobic nonaqueous solvent), the system was stirred, and then 0.2 to 0.5 g of TEXAPHOR 963 (trade name for a polycarboxylic acid amine salt) surfactant was added and a colloidal solution was produced.

Acetaldehyde was added as a reducing agent to this colloidal solution, and the system was stirred for five minutes at a constant temperature of 65° C., whereupon the color of the solution changed to transparent chrome yellow, and a dispersion solution of ultrafine composite metal particles was obtained. This solution was kept for one week in a refrigerator, after which there was no change in the transparent yellow solution, indicating that stable ultrafine composite metal particles had been formed in a solution dispersed state.

The surface plasmon absorption of this solution was examined, and an absorption peak was revealed at a wavelength of 450 nm. This indicates that there was a metal core with a diameter of approximately 30 nm. When the ultrafine composite metal particles were imaged by atomic force microscope (AFM), an overall doughnut shape was seen, with the diameter of the doughnut being about 100 nm. High resolution transmission electron microscope (HRTEM) gave a clear lattice image of the metallic silver, with the median of the particle size distribution thereof being about 30 nm, which matches the results of surface plasmon absorption.

It was concluded from this that there was a metal core in the hollow part of the doughnut, that the doughnut part was a surfactant sheath (containing an organic compound sheath in parts), and that ultrafine composite metal particles having a metal core of silver of approximately 30 nm were obtained in this Example.

Example 4

Production of Nickel Oleate Colloid by Second Method

Ultrafine metal particles were prepared by using nickel oleate as the organic metal compound. First, nickel oleate was prepared according to a known method. Commercially available sodium oleate was dissolved in pure water by heating to 60° C. Separately, an equivalent amount of nickel nitrate was dissolved in pure water and then added to the previously prepared sodium oleate aqueous solution. The precipitated oily nickel oleate was separated with a separating funnel.

50 g of the nickel oleate obtained in this manner was weighed out and put into a 1000 ml round-bottom flask, and 0.5 g of a nonionic surfactant (trade name SPAN 40), 100 g of toluene, and 50 g of ethanol were added and stirred. This stirring emulsified the nickel oleate. Then, 5 g of glucose was added, and the system was heated to 50° C., whereupon the solution turned brown. Ten minutes later 200 ml of methanol was added, and the system was cooled to obtain a precipitate.

This was dried dropwise over mica, and then observed by atomic force microscope, which revealed ultrafine composite metal particles with a diameter of 8 nm.

Example 5

Production of Silver Acetate Colloid by Third Method 0.01 g of silver acetate was dispersed in 100 ml of cyclohexane (a nonaqueous solvent). Propionaldehyde with a concentration of 95% was added as a reducing agent to 40 ml of this solution, then 0.1 g of AMIET105 (trade name for a polyoxyethylene-alkylamine) was added as a dispersant (surfactant), and the system was stirred for five minutes at 65° C.

The solution was a transparent lemon yellow, indicating that ultrafine composite metal particles had been produced. The surface plasmon absorption spectrum of this solution indicated an absorption peak at a wavelength of 408 nm. It was found from this absorption peak that the diameter of the metal core was 2 to 3 nm. When the ultrafine composite metal particles were observed by TEM, they were found to have a doughnut structure with a diameter of approximately 30 nm. Therefore, this example formed ultrafine composite metal particles having a metal core of silver with a diameter of 2 to 3 nm.

Example 6

Production of Indium Diethylhexanoate Colloid by Third Method

Indium diethylhexanoate was dissolved in an amount of 5 wt % in toluene (a nonaqueous solvent). 5 ml of this solution was added to and mixed with 40 ml of toluene, to which 0.2 g of TEXAPHOR 963 (trade name for a polycarboxylic acid amine salt) was added as a surfactant, and 2 ml of propionaldehyde was added as a reducing agent.

This colloidal solution was stirred for five minutes at 65° C., whereupon the entire solution turned transparent yellow, and stable ultrafine composite metal particles were formed. The absorption spectrum of this solution indicated an absorption peak at a wavelength of 430 nm. It was found from a TEM image that the diameter of the indium metal core was 5 nm. When the ultrafine composite metal particles were observed by AFM, they were found to have a doughnut structure with a diameter of approximately 50 nm. This example formed ultrafine composite metal particles having a metal core of indium with a diameter of 5 nm.

Example 7

Production of Copper Acetate Colloid by Third Method

Copper acetate was dissolved in 100 ml of toluene (a nonaqueous solvent) to create a 0.1 wt % toluene solution. SORBON T80 (trade name for sorbitan carboxylate) was added as a surfactant to this solution, thereby making a colloidal solution of copper acetate. Ascorbic acid was added as a reducing agent to this colloidal solution, and the system was heated to 100° C. and stirred for five minutes.

The solution turned transparent wine-red in color, indicating that ultrafine composite metal particles had been formed. It was confirmed from the surface plasmon absorption of this solution that a metal core of copper with a diameter of 10 nm had formed.

Example 8

Production of Silver Stearate Colloid by Third Method

Ultrafine metal particles were prepared using silver stearate as the organic metal compound. First, silver stearate was prepared according to a known method. Commercially available sodium stearate was dissolved in pure water by heating to 60° C. Separately, an equivalent amount of silver nitrate was dissolved in pure water and then added to the previously prepared sodium stearate aqueous solution. The precipitated silver stearate was filtered off with a suction filter, after which it was dried with a dryer.

50 g of the silver stearate obtained in this manner was weighed out and put into a 1000 ml round-bottom flask, and 0.5 g of a nonionic surfactant (trade name TWEEN 80) and 100 g of toluene (as a nonaqueous solvent) were added. This solution was stirred with an ultrasonic emulsifier to prepare suspension of silver stearate. 5 g of formic acid was then added as a reducing agent, and the suspension was heated to 40° C. to promote reduction, whereupon the suspension gradually turned purple. 30 minutes later the system was cooled to halt the reduction, and 300 ml of methanol was added as a precipitation solvent to obtain a precipitate.

This modified powder was observed under a transmission electron microscope, which revealed it to be composed of ultrafine particles with a diameter of approximately 5 nm and to have an extremely high uniformity of particle size. A core of metallic silver was confirmed by powder X-ray diffraction. The proportion of the metal component was determined by thermal analysis, which revealed that the organic groups accounted for approximately 15 wt %, and these groups were confirmed to be stearic acid groups from the results of elemental analysis and so forth. At the same time, the TWEEN 80(surfactant) component was found to account for 10 wt %. In other words, it was found that the particles comprised a silver core, a stearic acid group layer, and a surfactant sheath of TWEEN 80 around the most outside.

When this ultrafine particle powder was dispersed in toluene and n-hexane, no precipitation was seen in either case, and the dispersion was in a transparent solubilized state. It can be understood that the high solubilization is the result of the surfactant sheath being present around the most outside of the ultrafine particles.

The ultrafine composite metal particles in this soluble state were used to coat a polyimide; and when the coating was dried and then heated, it was readily sintered at approximately 220° C., forming a silver coating film. Therefore, these ultrafine composite metal particles composed of a silver core, a silver stearate layer, and a surfactant sheath were confirmed to have high dispersibility and also extremely good performance in terms of metal film formation.

The present invention provides ultrafine composite metal particles comprising a surfactant sheath and an organic compound sheath surrounding a metal core; and since a powerful stabilizer of dispersion in a nonaqueous solvent (a surfactant) is disposed around the outside, the dispersion stability is far higher than that of conventional ultrafine composite metal particles composed of just an organic compound sheath. Also, because an organic compound sheath is included, a synergistic dispersion stabilizing effect can be achieved.

The present invention provides ultrafine composite metal particles comprising a surfactant sheath surrounding a metal core; and since a powerful stabilizer of dispersion in a nonaqueous solvent (a surfactant) is disposed around the outside, the dispersion stability is far higher than that of conventional ultrafine composite metal particles composed of just an organic compound sheath.

The present invention provides ultrafine composite metal particles in which the metal core comprises an alloy of a plurality of types of metal. Thus, so many different kinds of ultrafine metal particles can be produced, and this further expands their applicability to the formation of electrode films and so on.

In the present invention, the metal component can be selected from Cu, Ag, Au, Zn, Cd, Ga In, Si, Ge, Sn, Pd, Fe, Co, Ni, Ru, Rh, Pd, Os, Ir, Pt, V, Cr, Mn, Y, Zr, Nb, Mo, Ca, Sr, Ba, Sb, and Bi, and a wide range of ultrafine composite metal particles can be produced.

With the present invention, ultrafine composite metal particles is formed in which a metal core is covered with an organic compound sheath, and the particle diameter of the metal core can be freely controlled by varying the amount of organic compound, the amount of solvent, the reduction conditions, and so forth. Also, since this manufacturing method requires no vacuum apparatus or other such sealed apparatus, mass production is feasible and ultrafine composite metal particles can be put on the market less expensively.

With the present invention, ultrafine composite metal particles is formed having at least a surfactant sheath around the outside of a metal core, and the particle diameter of the metal core can be freely controlled by varying the amount of organic or inorganic compound, the amount of solvent, the reduction conditions, and so forth. Also, since these particles can be manufactured in an open environment, mass production is feasible and ultrafine composite metal particles can be put on the market less expensively.

With the present invention, ultrafine composite metal particles is formed having at least a surfactant sheath around the outside of a metal core using a single nonaqueous solvent, and the particle diameter of the metal core can be freely controlled by varying the amount of organic or inorganic compound, the amount of solvent, the reduction conditions, and so forth. Also, since there is no need for a vacuum apparatus or other large apparatus, mass production is feasible and ultrafine composite metal particles can be put on the market less expensively.

With the present invention, ultrafine composite metal particles in which the metal core consists of an alloy of a plurality of types of metal is formed from a plurality of organic metal compounds.

With the present invention, ultrafine composite metal particles in which the metal core consists of an alloy of a plurality of types of metal is formed from a plurality of inorganic metal compounds.

What is claimed is:

1. A ultrafine composite metal particle characterized in that a surfactant sheath and an organic compound sheath surround a metal core in which metal atoms obtained by reduction precipitation from an organic metal compound dispersed in nonaqueous solvent have agglomerated, a diameter of said particle being 1 to 100 nm.

2. A ultrafine composite metal particle characterized in that a surfactant sheath surrounds a metal core in which metal atoms obtained by reduction precipitation from an inorganic metal compound dispersed in nonaqueous solvent using a surfactant have agglomerated, a diameter of said particle being 1 to 100 nm.

3. The ultrafine composite metal particle according to claim 1 or 2, wherein said metal core is made up of an alloy of a plurality of different metals.

4. The ultrafine composite metal particle according to claim 3, wherein said metal component is at least one selected from Cu, Ag, Au, Zn, Cd, Ga, In, Si, Ge, Sn, Pd, Fe, Co, Ni, Ru, Rh, Pd, Os, Ir, Pt, V, Cr, Mn, Y, Zr, Nb, Mo, Ca, Sr, Ba, Sb, and Bi.

5. The ultrafine composite metal particle according to claim 1 or 2, wherein said metal component is at least one selected from Cu, Ag, Au, Zn, Cd, Ga, In, Si, Ge, Sn, Pd, Fe, Co, Ni, Ru, Rh, Pd, Os, Ir, Pt, V, Cr, Mn, Y, Zr, Nb, Mo, Ca, Sr, Ba, Sb, and Bi.

6. A method for manufacturing ultrafine composite metal particles, characterize in that said method comprises:
   a first step of forming an ultrafine particle precursor by producing a colloidal solution of an organic metal compound in a mixed solvent of a hydrophobic nonaqueous solvent and a hydrophilic nonaqueous solvent; and
   a second step of reducing said ultrafine particle precursor by adding a reducing agent to said colloidal solution, thereby forming ultrafine composite metal particles each having a diameter of 1 to 100 nm and having an organic compound sheath around a metal core.

7. A method for manufacturing ultrafine composite metal particles, characterized in that said method comprises:
   a first step of forming an ultrafine particle precursor by, with a use of a surfactant, producing a colloidal solution of an organic metal compound or an inorganic metal compound in a mixed solvent of a hydrophobic nonaqueous solvent and a hydrophilic nonaqueous solvent; and
   a second step of reducing said ultrafine particle precursor by adding a reducing agent to said colloidal solution, thereby forming ultrafine composite metal particles each having a diameter of 1 to 100 nm and having at least a surfactant sheath around a metal core.

8. A method for manufacturing ultrafine composite metal particles, characterized in that said method comprises:
   a first step of forming an ultrafine particle precursor by, with a use of a surfactant, producing a colloidal solution of an organic metal compound or an inorganic metal compound in a nonaqueous solvent; and
   a second step of reducing said utrafine particle precursor by adding a reducing agent to said colloidal solution, thereby forming ultrafine composite metal particles each having a diameter of 1 to 100 mn and having at least a surfactant sheath around a metal core.

9. The method for manufacturing ultrafine composite metal particles according to claim 6, 7, or 8, wherein said organic metal compound is composed of a plurality of organic metal compounds of different types of metal, and said produced metal core is made up of an alloy of a plurality of different metals.

10. The method for manufacturing ultrafine composite metal particles according to claim 7 or 8, wherein said inorganic metal compound is composed of a plurality of inorganic metal compounds of different types of metal, and said produced metal core is made up of an alloy of a plurality of different metals.

* * * * *